(12) United States Patent
Mocciaro

(10) Patent No.: US 6,435,680 B2
(45) Date of Patent: Aug. 20, 2002

(54) CONTINUOUS FRAMES FOR GLASSES

(76) Inventor: Salvatore Mocciaro, Via Carlo Alberto 87/i, Cassolnovo (Pavia) (IT)

(*) Notice: Subject to any disclaimer, the term of this patent is extended or adjusted under 35 U.S.C. 154(b) by 0 days.

(21) Appl. No.: 09/911,040

(22) Filed: Jul. 23, 2001

Related U.S. Application Data

(63) Continuation of application No. PCT/IT00/00030, filed on Feb. 2, 2000.

(30) Foreign Application Priority Data

Feb. 2, 1999 (IT) .......... MI99A0187

(51) Int. Cl.$^7$ .................. G02C 1/00
(52) U.S. Cl. ............. 351/83; 351/41; 351/90; 351/131
(58) Field of Search ............ 351/83, 41, 87, 351/88, 90, 92, 95, 98, 111, 131, 158, 178; 2/439, 454

(56) References Cited

U.S. PATENT DOCUMENTS

| | | | |
|---|---|---|---|
| 1,425,919 A | | 8/1922 | Tremblay |
| 4,302,080 A | | 11/1981 | Bononi |
| 5,000,558 A | * | 3/1991 | Blackstone .......... 351/41 |
| 5,469,231 A | | 11/1995 | Huang |
| 5,828,436 A | | 10/1998 | Lester |
| 6,082,857 A | * | 7/2000 | Lockhart .......... 351/178 |

FOREIGN PATENT DOCUMENTS

| | | |
|---|---|---|
| BE | 550 087 | 12/1959 |
| FR | 1 077 777 | 11/1954 |
| WO | WO 93 18429 A1 | 9/1993 |
| WO | WO 97 23803 A1 | 7/1997 |

* cited by examiner

*Primary Examiner*—Huy Mai
(74) *Attorney, Agent, or Firm*—Akin, Gump, Strauss, Hauer & Feld, L.L.P.

(57) ABSTRACT

This invention refers to a way of producing frames for glasses of different types but all with the characteristic of lacking in weldings and in the hinge that normally joints the frontal with the bars since such a purpose has been absolved by the elasticity of the material. During the same production process also the exhibitor for the point of sale will be realized, thereby reducing costs, times and wastes. Besides, with a couple of spectacle or sun lenses, even if expensive, it will be possible to preserve them, while the frame will be replaced by a different one compatible with the couple of lenses. Frontal, bars and nose pads, that is all the structure of the glasses, are made at the same time from one metallic plate. Through different techniques such as the laser cut, the electric erosion and above all the photo-chemical etching technique, the metallic plate is worked and subsequently is folded up in the suitable way to achieve the definitive shape. A part of the plate will generate the frames for glasses, and another part will be used for the samples of color, while the remaining part that contains the whole will be used like an exhibitor of the same glasses, once folded up in the correct way. Part of the bending is transmitted to the frames, that have the right thickness for the purpose, by the same lenses with negative chamfer to be inserted in the elastic joint with the suitable shape. The compactness of the frames and of the exhibitor, when not folded up, facilitates the delivery and the storage of their collection. Besides, for removing the problem of holding the folded up glasses, a tubular sheath of plastic transparent material, in which the glasses will be put in, will be employed.

21 Claims, 2 Drawing Sheets

CONTINUOUS FRAMES FOR GLASSES

CROSS-REFERENCE TO RELATED APPLICATION

This application is a continuation of International Application No. PCT/IT00/00030, filed Feb. 2, 2000, published in the English language, the disclosure which is incorporated herein by reference.

BACKGROUND OF THE INVENTION

The realization of traditional metallic frames for spectacles or sunglasses requires qualified manpower and adequate infrastructures. Several assemblage phases are normally necessary in order to have the finished glasses, thereby involving the use of different trinkets, frontal, bars, etc. The productive method for realizing frames for glasses described in this invention introduces a series of constructive simplifications which allow to avoid the trinkets and reduce the necessary manpower, thereby reducing costs and obtaining esthetical quality and structural sturdiness. This innovative approach will also allow to reuse the lenses, that usually represent the most expensive part of the glasses, since it will be easy to replace the frame alone, that will be compatible with the lenses and available in different shapes.

Currently, in the metal frames for glasses the frontal is always separated from the bars, even when a special metal like titanium is used. The frontal and the bars are connected by hinges of various types, that are normally welded thereto, or by a joint between them. The bridge and the nose pads also require weldings in many cases, but metallic frontals made of a single plate are possible. The presence of the lenses implies the need of using regulation bolts or nylon threads, and a qualified manpower. The frames made of metallic plates are always thicker than 0.5 mm, and require the use of presses for engraving therein the correct bending required to hold the lenses. Moreover, the exhibitors of the glasses are produced in a different context and are currently not considered for the productive optimization of the glasses, since they are seen as a subsequent problem, untied from the design of the frames.

FR-A-1077777 and U.S. Pat. No. 5828436 disclose frames for glasses made of one piece of cardboard or plastic. However, these known frames, if they were made of metal, i.e. the best material for this purpose, could not be easily used or provided with lenses without substantial changes to their particular shape and/or structure.

BRIEF SUMMARY OF THE INVENTION

This invention aims at simplifying the production of the frames for glasses, thereby reducing manpower, lowering the costs, eliminating the trinkets, and making the structure lighter. Through the redesign of the traditional frame for glasses, we have defined a geometry that can be obtained in a single step from a plate of an adequately flexible metallic material, and through subsequent foldings that can be customized, this frame reaches the desired shape. Using the photo-chemical etching technology, starting from a plate of metallic material with the correct elasticity and thickness, the elasticity of the material in the zones subject to bending is exploited, in particular in the zone that traditionally hosts the hinge. Another advantage will consist in that, given a lens shape, it will be possible to choose between different shapes and types of frames without necessarily changing the lenses, with big advantages for those who want to use these frames with spectacles lenses, the cost of which is high. The glasses will be accompanied by a series of items that will facilitate their sale and that, being produced at the same time with the glasses, will lead to an economic advantage. The remaining part of the plate making both the glasses and the accessories will serve as an exhibitor for the glasses, optimizing the productive process. The metallic plate will serve to perform in a single pass all the superficial treatments to finish the glasses, because it is provided with anchorage holes (FIG. 1 detail A).

The current state of the art involves weldings and separate components in the proximity of the bridge, of the nose pads and of the hinge zone. In each case, in the current manufacturing process the zone of the hinge always involves the physical division between frontal and bars. By eliminating the need for the weldings through the proposed geometry, the method of workmanship of the plate and of the following folding simplifies and resolves this problem. The elimination of the trinkets contributes-to the reduction of the overall weight. Moreover, the resultant structure will be more robust, as no part will be able to be separated from the others, since the whole is a single monolithic and elastic element. The terminal part of the bars comes commonly covered with finishes in plastic materials: in the present invention, in addition to this solution it will also be possible to adopt a finish made by wrapping an antiallergic ribbon around the metal. If the product, due to the reduced thickness of the foil, does not guarantee adequate safety, it will be possible with subsequent interventions to apply a paint around the edges, also to facilitate the insertion of the lenses, and to realize such treatments for several frames at the same time, because they all lie on the same plate, something that will reduce the costs and will improve the quality.

Some of the advantages achievable with the present invention will be the following: [1] inexpensive production due to the reduction of the manpower that will fold up the frame, insert the lenses, the silicon nose pads and the terminals, [2] the same lenses determine the shape of the frame and they bend it since the frame has a reduced and flexible thickness: this does not require the pressing step of the same frame, [3] it is possible to preserve the lenses, above all when these are spectacle lenses and therefore more expensive, and to vary the frame only, because for each shape of lens different shapes of frames will be available, [4] the hinge zone exploits the elasticity of the material and the reduced thickness of the plate making the glasses, with the further possibility of checking the efficiency using the photo-chemical etching where the thickness of the plate is greater than 0.5 mm, [5] the productive methods for the proposed types of metal glasses could be different but particularly the one employing metallic plates which are photo-chemical etched is the most efficient and also allows the customization of the individuals models at limited costs, [6] the pressure joint of the lenses inside the outline of the frame is facilitated by the presence of incisions of the correct length that represent zones of elastic yielding of the structure, [7] the terminal part of the bars will be wound also by a ribbon of an anti-allergic material, [8] the frames could be not folded up by the manufacturer, but by the optician or by the final consumer for facilitating the storage and the delivery, [9] the exhibitor is produced during the same productive process of the glasses, thereby reducing the cost, [10] the whole plate from which the glasses are made is arranged for the superficial treatments that are desired: painting, polishing, electric coloring, the latter resulting of appreciable quality for the absence of weldings in the frames, [11] due to the lack of hinges in the glasses manufactured according to the above mentioned principles, for keeping the same glasses protected and in a position of rest a sheath of soft material will be used, for example plastic, an extruded pipe of transparent material, cut at the correct length and in which the glasses can be inserted.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to, the precise arrangements and instrumentalities shown. In the drawings.

DETAILED DESCRIPTION OF THE INVENTION

Figure 1:
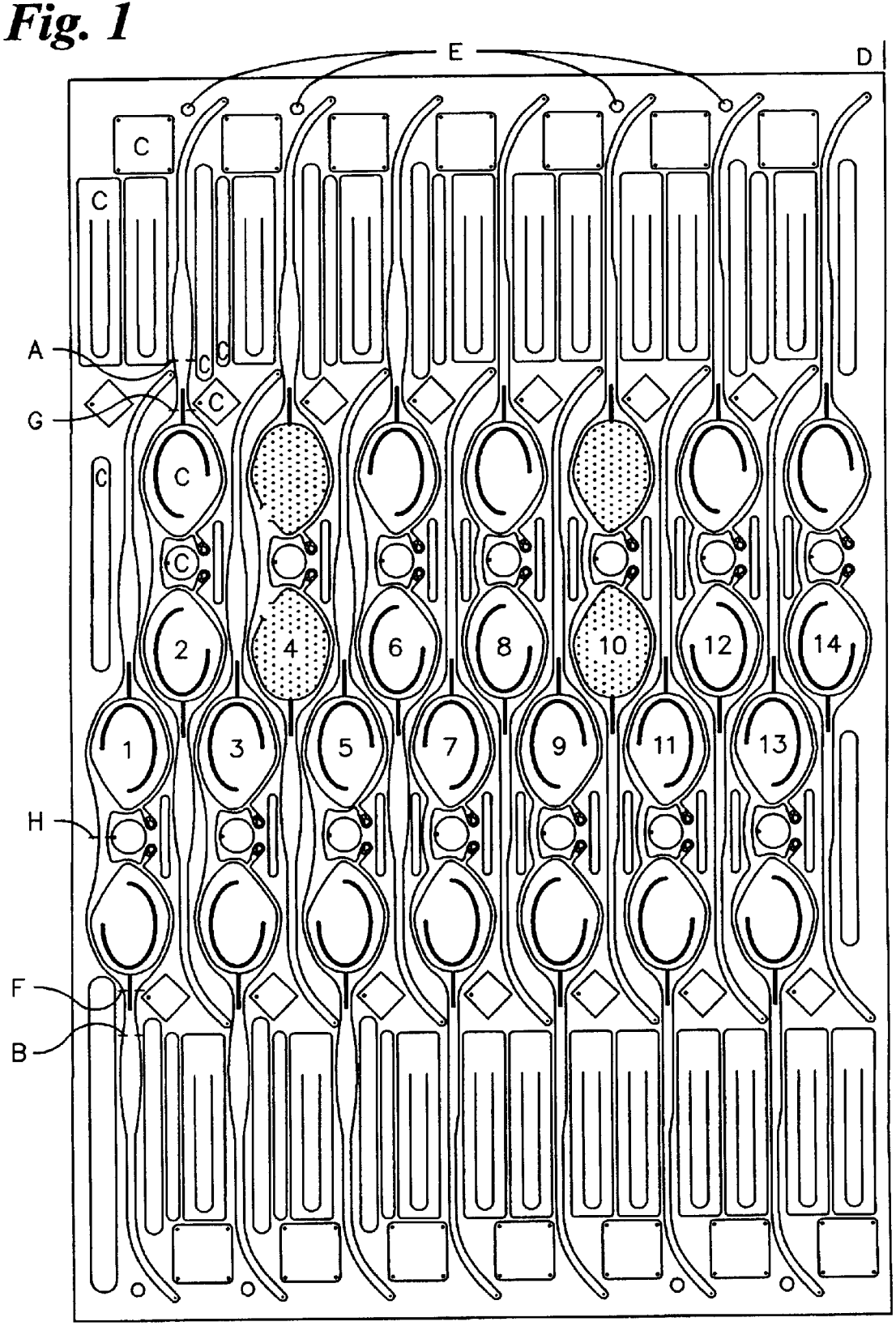
FIG. 1 shows the working phase of the photo-chemical etching of the metallic plate with different profiles of frames that use the same lens, as well as details resulting from the same metallic plate that at the end will act as an exhibitor.

The frames for glasses 1, 2, 3, 4, 5, 6, 7, 8, 9, 10, 11, 12, 13, 14 shown in (1/2 FIG. 1) are examples of application of the invention wherein the shapes of the frames vary while the shapes of the lenses remain unchanged, all lenses with a negative chamfer, with a big advantage for the use as spectacles considering the achievable saving for the user. Between these different frames only the one identified as 10 does not have lenses but a series of holes with the purpose of whet the sight or only for purely esthetical purposes. The frame 4 has, together with the lenses, a grate, connected with the frame, folded up for being superimposed to the lens. In all the other cases the frames 1, 2, 3, 5, 6, 7, 8, 9, 11, 12, 13, 14 are variations of form made around the same shape of lenses where the versions 5, 6, 11, 12 only have right lenses or left lenses and this :determines their asymmetrical appearance. The particular C of the assembly figure (1/2 FIG. 1) show replaceable elements that will serve as color samples, bookmarks or more. The details E of the same figure are holes of anchorage for the finishing treatments.

Figure 2:
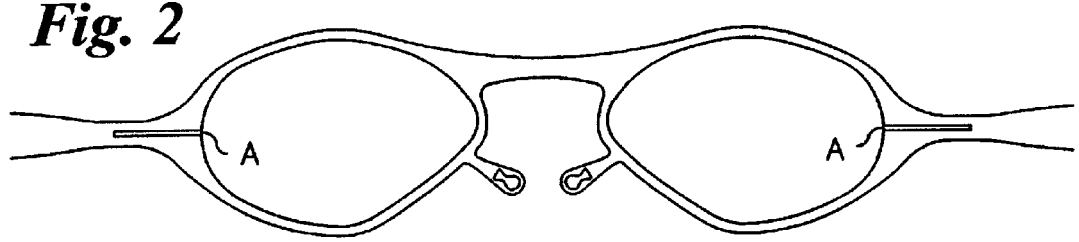
FIGS. 2–7 show some examples of frames according to the application of the present invention.
Figure 3:
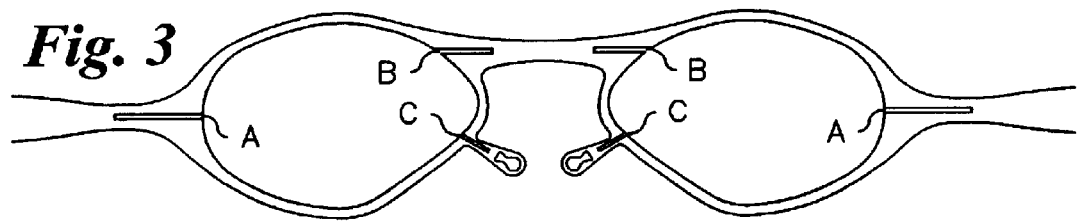
Figure 4:
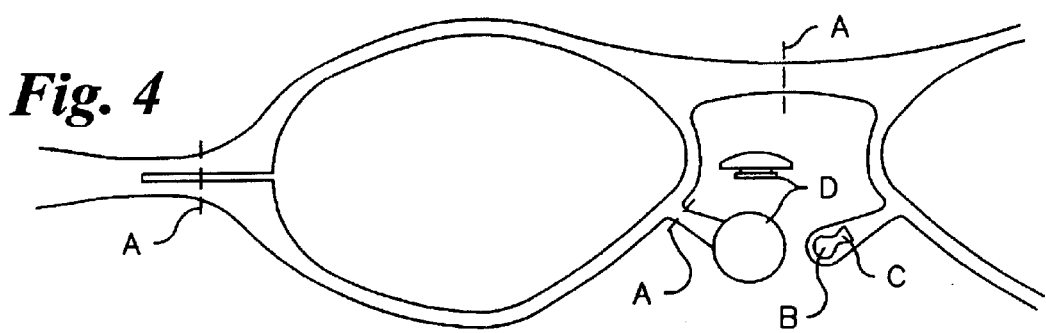
Figure 5:
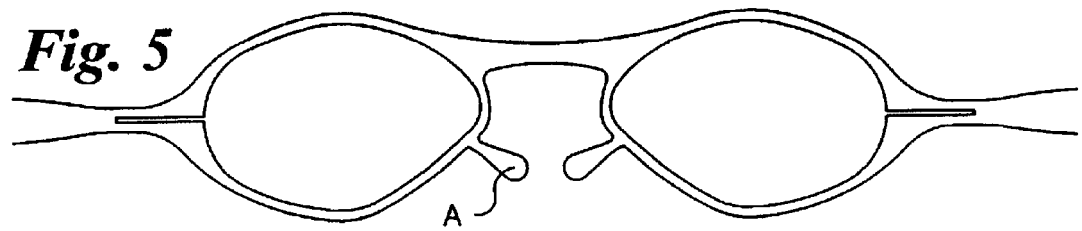
Figure 6:
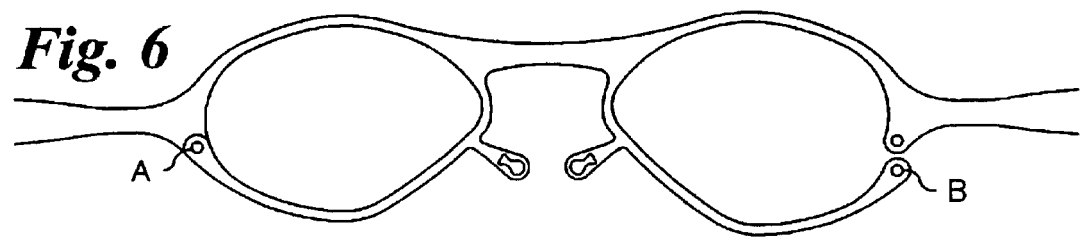
Figure 7:
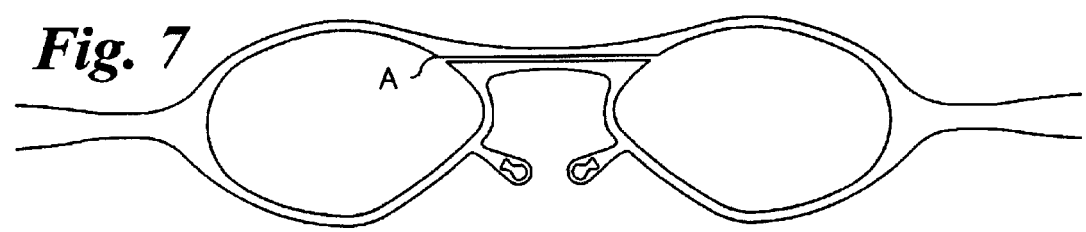

The lines of fold A and B of the figure (1/2 FIG. 1) allow to get the exhibitor of the same glasses with the remaining part of the plate, once the frames 1, 2, 3, 4, 5, 6, 7, 8, 9, 10, 11, 12, 13, 14 and the C parts are separated. Such an exhibitor is supported by the suitable base with the D letter in the principal figure (1/2 FIG. 1) and will allow the positioning of the glasses once they are folded up toward the outside of the zones between the bridge and the nose pads of each frame. The lines of fold F, G, H in (1/2 FIG. 1) are those which transform the flat frame 1 and make it take on the shape of the glasses. The frame described in (2/2 FIG. 2) shows a frame with the incisions A made inside the opening for the lens near the zones of contact with the bar having the double purpose of allowing the elastic insertion of the lens and weaken the hinge zone for facilitate the bending. The (2/2 FIG. 3) instead presents the incisions in A, B and C, the three areas corresponding to the hinge, to the bridge and to the nose pads. These incisions will be present all together or singularly or in couple for allowing an elastic coupling of the lens in its opening. The (2/2 FIG. 4) shows the two positions B and C in which the nose pads D of silicone will find place for allowing the adaptation of the glasses to the face, while the lines of fold A show the zones in which the frame would be folded up. The (2/2 FIG. 5) in the detail A shows a flat zone where it is possible to glue or put on the nose pads of silicone of the suitable shape or, by doing without the silicone component, having recourse to superficial painting treatments of the frame, for M:making the prominences A act as nose pads. The (2/2 FIG. 6) shows an example of frame with a zone opened in the B point for facilitating the insertion of the lenses that will be subsequently closed with the aid of bolts will come with or without the relative nut until it takes the position shown by the particular A. The (2/2 FIG. 7) shows a further type of frame that presents the detail. in the zone of the bridge A that represents a double bridge that connects the holes for inserting the lenses: this allows to insert the lenses easily and to fix them in their openings and subsequently the two parts of the double bridge are mutually connected in various ways, one of these providing for an adhesive band.

In the sector of the production of glasses the productive method described in the present invention finds application for the spectacles or sunglasses. The lenses that will be used must be worked with a negative chamfer, so that in the groove of the lens could be inserted for the necessary depth the foil that makes up the frame. When the lens is selected for shape, for color, for degrees at a specialized optician, it will be possible to choose the preferred frame at the same moment. As an alternative, the choice of new frames will happen by means of the use of the media, including Internet, through which the appearance will be updated, thereby leaving unchanged the qualitative characteristics of the lenses which have been already purchased. The exhibitors made together to the glasses have multiple uses and they are lent themselves to be combined in a vertical and/or horizontal position on suitable supports, they are light, compact and cheap. It will be possible to furnish exhibitors of different color deriving from different plates from those of the collection exposed so that to create the necessary chromatic contrast for showing the different models of glasses.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. Frame for glasses in a continuous shape, characterized in that the frame is made from one metallic plate, comprising a frontal, bars, a bridge and nose pad receiving areas, wherein a) the frontal, bars, bridge and nose pad receiving areas are mutually connected, b) a hinge zone which connects the frontal and the bars is constructed of a material having the same elasticity as the metallic plate, c) the frontal contains two openings for lenses, d) the metallic plate has a thickness equal to or less than 0.5 mm, and e) the frontal contains at least one incision in communication with at least one of the openings for lenses.

2. Frame for glasses according to claim 1, characterized in that the frame is obtained from the metallic plate by means of photo-chemical etching.

3. Frame for glasses according to claim 1, characterized in that the frame is obtained from the metallic plate by means of laser cut, electric erosion, or mechanical cut.

4. Frame for glasses according to claim 1, characterized in that the frame is folded near the zones of the hinges, the bridge and the nose pad receiving areas.

5. Frame for glasses according to claim 4, characterized in that the frame includes indicia of the fold area in a flat version to allow their adaptation to the face of the user.

6. Frame for glasses according to claim 1, characterized in that the shape of the lens has a negative chamfer for using again the lenses by substituting only the frames or for varying only the color of the lenses, thereby allowing the substitution of the frames only.

7. Frame for glasses according to claim 1, characterized in that the incision for facilitating the insertion of the lenses with negative chamfer is in the zone of the hold nose and/or of the bridge.

8. Frame for glasses according to claim 1, characterized in that the incision for the insertion of the lenses with negative chamfer is in the zone of the hinge, thereby having the double purpose of allowing the elastic insertion of the lens and weakening the hinge zone for facilitating the bending.

9. Frame for glasses according to claim 1, characterized in that the terminal part of the bars is finished with a ribbon wound with a spiral movement.

10. Frame for glasses according to claim 1, characterized in that it is provided with an opening in the zone that surrounds the lens for facilitating the insertion, said opening being closed around the same lens through the subsequent fixing with a bolt passing into corresponding holes.

11. Frame for glasses according to claim 1, characterized in that it is provided, for facilitating the insertion of the lenses, with an incision connecting the opening for the lenses in the zone of the bridge, that becomes double, and that is kept in position through bolts, a thread of nylon, an adhesive tape, a jointing member or other fixing means.

12. Frame for glasses according to claim 1, wherein nose pads of silicone are glued on a suitable flat surface of the nose pad receiving areas near the bridge.

13. Frame for glasses according to claim 12, characterized in that the nose pads of silicone comprise a sheath.

14. Frame for glasses according to claim 12, characterized in that the nose pads of silicone are inserted into the frame through an eight-shaped opening that allows two positions of the same silicone pads for the adaptation to the face of the user.

15. Frame for glasses according to claim 1, characterized in that a part (4) of the frame is perforated in correspondence of the lens like an eyelid, which is folded up to surmount the same lens.

16. Frame for glasses according to claim 1, characterized in that the opening for the lenses consists in a series of holes (10) of different shapes with the purpose of whet the sight or with an esthetical purpose only.

17. Frame for glasses according to claim 1, characterized in that the nose pad receiving areas comprise a flat surface coated with a soft and anti-allergic material.

18. Frame for glasses according to claim 1, characterized in that the nose pad receiving areas start from the upper zone of the bridge and is folded up downwards and then sideward for obtaining the definitive conformation.

19. A system comprising a frame for glasses according to claim 1, and a case box in the form of a pipe of transparent plastic material cut to a suitable length and in which the frame can be inserted, thereby avoiding the complete opening of the frame due to the elasticity of the metallic material forming the frame.

20. Exhibitor comprising a metallic plate having a thickness equal to or less than 0.5 mm, characterized in that the exhibitor comprises the frame for glasses according to claim 1 and wherein side portions of the plate are foldable so as to allow a standing position of the plate.

21. Exhibitor according to claim 20, characterized in that the frames are connected to the plate in four points disposed in line, two at the extremity of the bars and the other two inside to the prominences for the nose pad receiving areas, for facilitating separation of the frames from the exhibitor.

* * * * *